United States Patent
Jain et al.

(10) Patent No.: US 10,505,883 B1
(45) Date of Patent: Dec. 10, 2019

(54) RE-ENGAGEMENT NOTIFICATIONS

(71) Applicant: Google Inc., Mountain View, CA (US)

(72) Inventors: Vardhman Jain, Mountain View, CA (US); Kathleen Ko, Mountain View, CA (US); Balaji Srinivasan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 399 days.

(21) Appl. No.: 14/674,740

(22) Filed: Mar. 31, 2015

Related U.S. Application Data (60) Provisional application No. 61/980,158, filed on Apr. 16, 2014.

(51) Int. Cl.
- *H04L 12/58* (2006.01)
- *G06Q 50/00* (2012.01)
- *G06Q 30/02* (2012.01)
- *H04L 29/06* (2006.01)

(52) U.S. Cl.
CPC .......... *H04L 51/32* (2013.01); *G06Q 30/02* (2013.01); *G06Q 50/01* (2013.01); *H04L 51/12* (2013.01); *H04L 51/14* (2013.01); *H04L 51/26* (2013.01); *H04L 65/403* (2013.01)

(58) Field of Classification Search
CPC ..... G06Q 50/01; G06Q 30/0207–0277; G06Q 30/02; H04L 51/14; H04L 51/26; H04L 51/32
See application file for complete search history.

(56) References Cited

U.S. PATENT DOCUMENTS

| | | | |
|---|---|---|---|
| 9,043,329 B1 * | 5/2015 | Patton | G06F 17/3087 707/740 |
| 9,630,090 B2 * | 4/2017 | Myslinski | A63F 13/00 |
| 2003/0068100 A1 * | 4/2003 | Covell | G06F 17/30256 382/305 |
| 2009/0006210 A1 * | 1/2009 | Cho | G06Q 30/02 705/14.54 |
| 2009/0019036 A1 * | 1/2009 | Roy | G06F 17/30648 |
| 2009/0076894 A1 * | 3/2009 | Bates | G06Q 30/02 705/14.61 |
| 2009/0240589 A1 * | 9/2009 | Vora | G06F 17/30864 705/14.6 |
| 2010/0329563 A1 * | 12/2010 | Luo | G06K 9/00765 382/190 |
| 2011/0054960 A1 * | 3/2011 | Bhatia | G06Q 30/02 705/7.12 |
| 2011/0066488 A1 * | 3/2011 | Ludewig | G06Q 30/00 705/14.43 |
| 2011/0246907 A1 * | 10/2011 | Wang | G06Q 30/0224 715/751 |

(Continued)

*Primary Examiner* — David R Lazaro
*Assistant Examiner* — Julian Chang
(74) *Attorney, Agent, or Firm* — Lowenstein Sandler LLP (57) ABSTRACT

A method is provided that includes receiving a plurality of messaging signals for a user. The method further determines an elapsed time from the sending of a previous message to the user. The method also includes determining a priority order for the plurality of messaging signals, examining the plurality of messaging signals according to the priority order to identify a valid messaging signal, and sending a message to the user based on the valid messaging signal.

20 Claims, 8 Drawing Sheets

(56) References Cited

U.S. PATENT DOCUMENTS

| | | | |
|---|---|---|---|
| 2011/0258049 A1* | 10/2011 | Ramer | G06F 17/30867 705/14.66 |
| 2012/0047201 A1* | 2/2012 | Jain | H04N 21/26225 709/203 |
| 2013/0054698 A1* | 2/2013 | Lee | G06Q 30/0259 709/204 |
| 2013/0151240 A1* | 6/2013 | Myslinski | G06F 17/20 704/9 |
| 2013/0158984 A1* | 6/2013 | Myslinski | G06F 17/28 704/9 |
| 2013/0198196 A1* | 8/2013 | Myslinski | G06F 17/30023 707/740 |
| 2013/0268591 A1* | 10/2013 | Chen | G06Q 50/01 709/204 |
| 2013/0297426 A1* | 11/2013 | Marx | G06Q 30/0269 705/14.66 |
| 2013/0325948 A1* | 12/2013 | Chen | G06Q 50/01 709/204 |
| 2014/0075385 A1* | 3/2014 | Wan | G06Q 10/1093 715/812 |
| 2014/0089125 A1* | 3/2014 | Kinnersley | G06Q 50/01 705/26.3 |
| 2014/0143050 A1* | 5/2014 | Boland | G06Q 50/01 705/14.53 |
| 2014/0188461 A1* | 7/2014 | Myslinski | G06Q 10/10 704/9 |
| 2014/0222833 A1* | 8/2014 | Jia | G06Q 30/02 707/748 |
| 2014/0229544 A1* | 8/2014 | Evans | G06Q 50/01 709/204 |
| 2014/0236663 A1* | 8/2014 | Smith | G06Q 10/0633 705/7.27 |
| 2014/0282977 A1* | 9/2014 | Madhu | G06Q 50/265 726/7 |
| 2015/0046515 A1* | 2/2015 | Pei | H04L 67/36 709/203 |
| 2015/0058750 A1* | 2/2015 | Chakra | G06Q 50/01 715/753 |
| 2015/0081695 A1* | 3/2015 | Schillings | G06F 17/30867 707/736 |
| 2015/0161672 A1* | 6/2015 | Jung | G06Q 30/0269 705/14.66 |
| 2015/0206183 A1* | 7/2015 | Zhou | G06Q 50/01 705/14.53 |
| 2015/0213372 A1* | 7/2015 | Shah | H04L 67/32 706/12 |
| 2016/0055541 A1* | 2/2016 | Calistri-Yeh | G06F 17/30867 705/14.66 |
| 2016/0117344 A1* | 4/2016 | Kleinpeter | G06F 17/30156 707/692 |
| 2016/0134577 A1* | 5/2016 | Owens | G06Q 50/01 709/206 |
| 2016/0277485 A1* | 9/2016 | Abrams | G06F 17/30867 |
| 2017/0098235 A1* | 4/2017 | Zilkha | G06Q 30/0239 |

* cited by examiner

RE-ENGAGEMENT NOTIFICATIONS

CROSS-REFERENCE TO RELATED APPLICATIONS

This application claims the benefit of U.S. Provisional Patent Application No. 61/980,158, filed on Apr. 16, 2014 and entitled "Re-engagement Notifications," the entire contents of which are incorporated herein by reference.

BACKGROUND

In recent years, the proliferation of the Internet has brought about significant changes in the ways users are able to interact with content and with each other. One example entails the sharing of internet resources on social networks. Through interfaces for generating posts on social networks, users are able to share internet resources such as media content to their social graphs.

Social networks can have many inactive users who do not utilize the system often and thereby do not derive enough value from the system. These users may have accounts in a relatively poor state of set-up, such that profile or account information is missing, which prevents such users from receiving many of the benefits of the platform.

Additionally, social networks operate on principles of reciprocity and network effect, so having many inactive users in the network can degrade the experience of those who are actively using the network, as well. If an active user sends a message or shares something with inactive users who do not see the content and reciprocate, then the active user may become less likely to share over the network in the future, and may eventually stop sharing altogether and become another inactive user.

SUMMARY

Implementations of the present disclosure provide methods, systems, and computer programs for sending re-engagement notifications, e.g., e-mails with quality and frequency constraints. It should be appreciated that the present disclosure can be implemented in numerous ways, e.g., a process, an apparatus, a system, a device or a method on a computer readable medium. Several implementations of the present disclosure are described below.

In accordance with some implementations, a method is provided, including the following method operations: receiving a plurality of messaging signals for a user; when the elapsed time exceeds a predefined time period, then, determining a priority order for the plurality of messaging signals, examining the plurality of messaging signals according to the priority order to identify a valid messaging signal, and sending a message to the user based on the valid messaging signal.

In some implementations, sending the message includes retrieving message content from the entity to define the message that is based on the valid messaging signal.

In some implementations, examining the plurality of messaging signals includes, for a given messaging signal, determining whether the given messaging signal is currently valid.

In some implementations, the given messaging signal identifies a message requesting the user to perform an action, and wherein determining whether the given messaging signal is currently valid includes determining whether the user has performed the action.

In some implementations, examining the plurality of messaging signals includes, for a given messaging signal, determining whether content identified by the given messaging signal currently exists.

In some implementations, wherein at least one of the messaging signals includes messaging content defining the message to be sent to the user.

In some implementations, sending the message is defined by an electronic communication selected from an e-mail, a notification, an alert, a private message, an instant message, or a text message.

In some implementations, the electronic communication is selected based on a predefined user preference.

In some implementations, examining the plurality of messaging signals defines an iterative process according to the priority order until the valid messaging signal is identified.

In accordance with some implementations, a method is provided, comprising the following method operations: identifying a plurality of social network users; filtering the plurality of social network users to identify eligible users to receive a communication; for each eligible user, identifying one or more messages to be sent to the eligible user, each of the one or more messages having a different message source; determining a ranked order for the one or more messages, the ranked order being determined based on a predefined rotation order of message sources and an identified message source of a previously sent message to the eligible user; validating and sending one of the one or more messages to the eligible user based on the determined ranked order.

In some implementations, filtering the plurality of social network users includes determining ones of the plurality of social network users that have not received a communication within a predefined preceding time period.

In some implementations, determining the ranked order includes identifying message sources that are positioned following the identified message source within the predefined rotation order.

In accordance with some implementations, a non-transitory computer readable medium having program instructions embodied thereon is provided. The program instructions include the following: program instructions for receiving a plurality of messaging signals for a user; program instructions for determining an elapsed time from sending of a previous message to the user; program instructions for, when the elapsed time exceeds a predefined time period, then, determining a priority order for the plurality of messaging signals, examining the plurality of messaging signals according to the priority order to identify a valid messaging signal, sending a message to the user based on the valid messaging signal.

These and other implementations may provide one or more of the following advantages. Various implementations provide for the management of the sending of messages to users. System resources are conserved by limiting recipient eligibility and prioritizing messages, thereby limiting the number of messages that are sent. Additionally, users do not receive too many messages in an uncoordinated fashion, thereby improving the user experience. In some implementations, not all messages which are intended for a user are actually sent to the user, so that the user receives a limited number of messages.

Other aspects will become apparent from the following detailed description, taken in conjunction with the accompanying drawings.

BRIEF DESCRIPTION OF THE DRAWINGS

The disclosure may be understood by reference to the following description taken in conjunction with the accompanying drawings.

DETAILED DESCRIPTION

The following implementations describe methods, computer programs, and systems for sending re-engagement notifications, e.g., e-mails with quality and frequency constraints.

The scope of a social network and its functionality can include many types of features and properties. For example, information, profiles and social graphs can be created, edited and managed by users. Additionally, a given social network may include features or properties such as endorsements, photos, communities, games, shopping, news, advertisements, private messages, instant messaging, etc. A social network may also serve as a platform for applications, each of which may define additional functionality in the context of the social network. Furthermore, social network functionality can be integrated across third-party sites, e.g. comments on a third-party site can be defined by a social network. These and other features demonstrate the broad scope and feature-rich content of social networks.

In view of the above, there may be many different systems or modules which manage the various aspects of a social network, each of which may be configured to send communications to a selected user. For example, a profile management system may send a communication encouraging the user to fill out their personal profile so that other users are able to view more information about the given user. A social graph management system may send a communication suggesting various members to be added to a selected user's social graph, e.g. members that are in the social graph of others that are already included in the user's social graph (friends of the user's friends), or members which have been identified from a contacts list associated with the user. A recent activity module may send a communication to the user containing information about recent activity on the social network which the user may have missed (e.g. posts, member updates, new members). A communities product system may send a communication to the user recommending communities within the social network for the user to join. A photos product system may send a communication to the user informing the user of the photos product or including recent photos which have been posted to the social network. An applications module may send a communication to the user recommending specific applications for the user to use, or highlighting new applications on the social network platform. The foregoing examples are provided by way of example and not limitation, as systems and modules managing other types of products or features on (or related to) the social network may also be configured to identify users and send communications to such users. Additionally, it is noted that such communications may be especially useful to send to users that have utilized the social network to a very limited extent or possibly stopped altogether, so as to encourage such users to re-engage with the social network.

Still other examples of systems or modules that may be configured to send messages to selected users include the following properties/products/features: events, video conferencing, news, maps, videos, music, blogging, calendar, documents, cloud storage, shopping, e-books, search, offers, sports, finance, travel, movies, entertainment, dating, games, weather, jobs, food, restaurants, etc.

As there may be many possible communications to be sent to a given user relating to the social network, there arise problems from both the perspective of the social network system and from the perspective of the user. When there are a high number of users, and each user is to receive a high number of communications, then the sending of the communications becomes very resource intensive. A communications system may not be fast enough to send all the communications to all of the users in a timely fashion. The result may be that some users will not receive communications which could be of value to them. From the user perspective, a user may receive a high number of communications, and this may be annoying to the user and degrade their experience with the social network. As a result, they may become less likely to engage with the social network.

Therefore, in the following description, various implementations provide for systems and methods to manage the prioritization and sending of communications to a user. In some implementations, a communication is contemplated as being an e-mail, though it will be appreciated that in other implementations, a communication can be any other type of message which may suitably convey the relevant content to the user, e.g. an instant message, a push notification, a private message, an application notification, or an alert.

Figure 1:
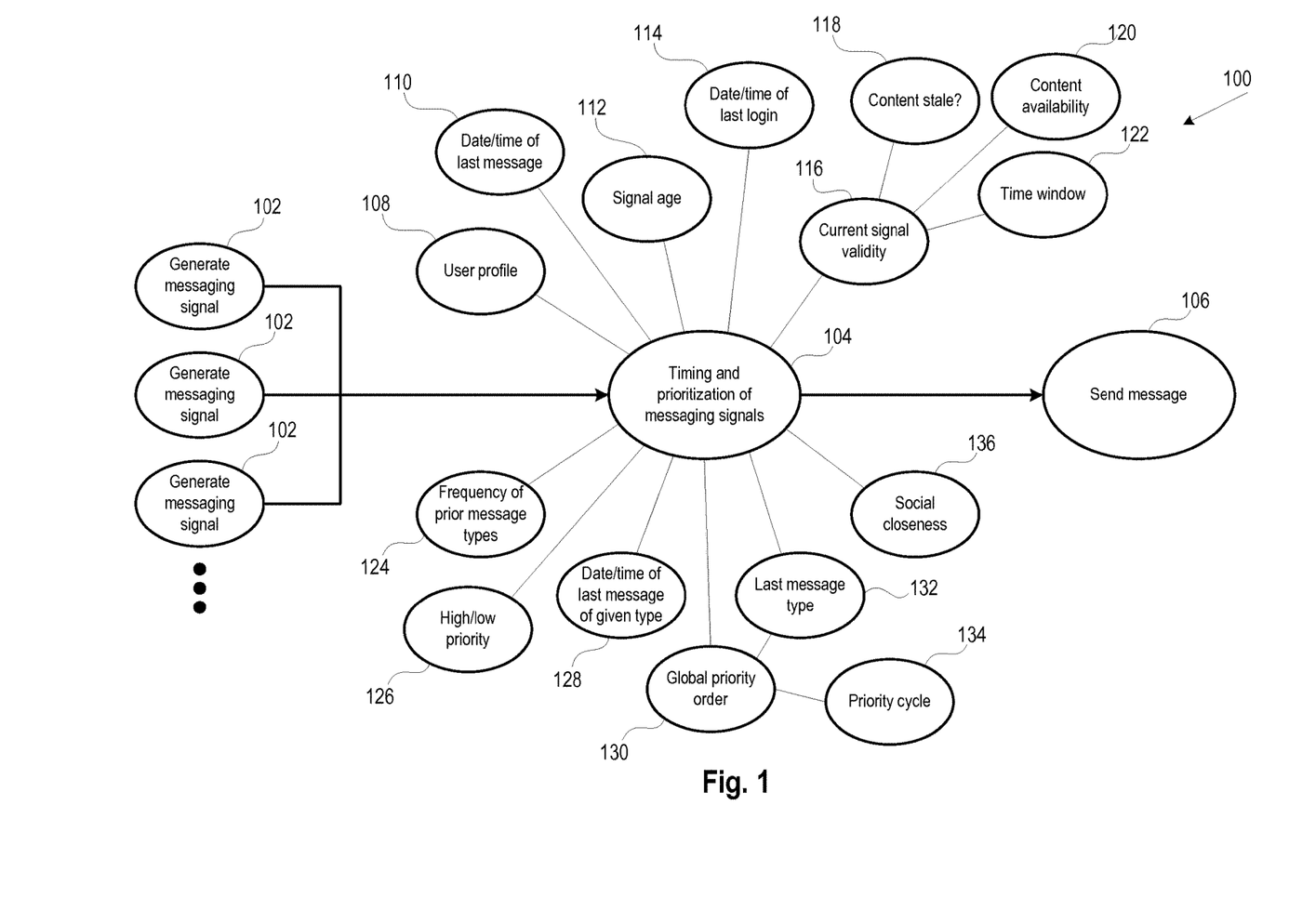
FIG. 1 conceptually illustrates a method for prioritizing and sending messages to a user of a social network.

FIG. 1 conceptually illustrates a method for prioritizing and sending messages to a user of a social network, in accordance with some aspects of the present disclosure. Method 100 may be performed by processing logic that may comprise hardware (e.g., circuitry, dedicated logic, programmable logic, microcode, etc.), software (such as instructions run on a processing device), firmware, or a combination thereof. In one implementation, method 100 is performed by re-engagement notification module 345 illustrated in of FIG. 3 and FIG. 8.

Referring to FIG. 1, as indicated at reference 102, messaging signals are generated. Each messaging signal is generated by a given source (e.g. product/property/feature management system) for a selected user, and indicates that the source has identified the selected user to receive a message. A given messaging signal may therefore contain an identification (ID) of a selected user, an indication that there is a message to be sent to the selected user, and may also identify the source of the message. As discussed in further detail below, a messaging signal may contain additional types of data to facilitate added functionality based on the messaging signal.

At reference 104, both the timing of and prioritization of messaging signals are determined. The timing of messaging signals defines when messages will be sent to users. In some implementations, the timing defines when a message will be sent to a given user, without regard to which specific message will be sent to the given user. In such implementations, the prioritization of the messaging signals which have been accumulated for the given user will define which particular corresponding message will be sent to the user.

In other implementations, the timing of specific messaging signals can be determined, and so define when a message indicated by a messaging signal will be sent to its selected recipient user. In such implementations, the prioritization of messaging signals may affect the final timing determination for a given messaging signal.

Several factors that may be considered in determining the timing and prioritization of messaging signals are described below. These are provided by way of example and not limitation, for purposes of illustrating certain implementations of the present disclosure.

In some implementations, a user profile can be considered when determining the timing and prioritization of messaging signals (108). A user profile can include various types of information about a given user, e.g. subject matter preferences, interests, hobbies, etc. It should be appreciated that such information about a user may be provided directly by the user or may be determined through analysis of a user's interaction history on the social network.

In some implementations, the date and time of the last message that was sent to a given user can be considered when determining the timing and prioritization of messaging signals (110). For example, in one implementation, a message will not be sent to a given user until a predefined period of time has elapsed since the date/time of the last message (e.g. two weeks, one day, 12 hours, etc.).

In some implementations, the age of messaging signals can be considered when determining the timing and prioritization of messaging signals (112). For example, in one implementation, older messaging signals are prioritized over younger messaging signals (i.e. messaging signals that were received/generated at an earlier time are prioritized over messaging signals that were received/generated at a later time). A messaging signal may include a time stamp indicating when it was generated/received.

In some implementations, the date and time of a user's last login or access activity can be considered when determining the timing and prioritization of messaging signals (114). For example, in one implementation, messages are not sent to a user until a predefined period of time has elapsed since the user's last login or access activity. The login or access activity may be on the social network, or on a related property incorporating or utilizing some of the social network's functionality. Furthermore, the login or access activity may be specific to a given messaging signal. For example, in one implementation, a message corresponding to a messaging signal for a given property/feature will not be sent unless a predefined amount of time has elapsed since the user's last login/access activity at the given property. In another implementation, messaging signals from properties/features having more recent login/access activity are de-prioritized relative to messaging signals from properties/features with less recent login/access activity.

In some implementations, the validity of messaging signals can be considered when determining the timing and prioritization of messaging signals (116). As discussed in further detail below, a given messaging signal may be validated to ensure that the message that it designates for sending to the user is still relevant or useful to send to the selected user. This can entail communicating back to the property from which the messaging signal originated to determine whether the messaging signal is still valid for its intended user. There are many reasons why a given messaging signal may or may not remain valid after it has been generated. For example, a messaging signal may become invalid if the content of the message designated by the messaging signal has become stale (118) (e.g. content is too old or has been updated, newer or more relevant content has become available, etc.). A messaging signal may become invalid if the content of the message designated by the messaging signal is no longer available (120) (e.g. content includes a posting that has since been deleted from the social network). A messaging signal may be valid if the current time lies within a predefined time window specified for the messaging signal, and invalid if the current time lies outside of the time window (122).

In some implementations, the frequency or distribution of prior message (and messaging signal) types can be considered when determining the timing and prioritization of messaging signals (124). A message type will be understood as indicating the property/feature from which a message (and its corresponding messaging signal) originated or for which the message (and its corresponding messaging signal) was generated. For example, messages that are defined to communicate recent social network activity have one type, while messages that are defined for a communities feature have another type, etc. The messaging signals corresponding to these messages have the same type. It should be appreciated that messages in this context have actually been sent to a user, whereas messaging signals may or may not result in actual messages being sent. Thus, the distribution of message types is distinct from the distribution of messaging signal types, and consideration of each can be useful for determining the timing and prioritization of messaging signals.

In one implementation, messaging signal types for which corresponding messaging types have a lower frequency or number are prioritized over messaging signal types for which corresponding messaging types have a higher frequency or number. In other words, when there has been a high number/frequency of messages of a particular type sent to a given user, then a messaging signal of the same type will be deprioritized as compared to a messaging signal having a type for which there have been a low number/frequency of messages sent to the user. In another implementation, a messaging signal having a type for which there has been a low number/frequency of prior messaging signals is prioritized over a messaging signal having a type for which there have been a high number/frequency of prior messaging signals.

In some implementations, assigned priority levels can be considered when determining the timing and prioritization of messaging signals (126). A messaging signal can have a priority level assigned to it. In one implementation, the priority level can be a binary indicator, e.g. high or low. In other implementations, the priority level can have any number of levels, and may be defined by any type of discreet or continuous quantification measure (e.g. high/medium/low, integers from 1 to 10, continuous numbers from 1 to 10, etc.). The priority level assigned to a given messaging signal provides a mechanism by which the source that generates the messaging signal may designate a relative measure of priority to be given to the messaging signal. The assigned priority level can then be utilized when determining the timing and prioritization of the messaging signal versus other messaging signals.

In some implementations, the date and time of the last message of a given type can be considered when determining the timing and prioritization of a messaging signal of the same type (128). For example, in one implementation, a first messaging signal is prioritized over a second messaging signal when the date/time of the last message of the same type as the first messaging signal is less recent than the date/time of the last message of the same type as the second messaging signal.

In some implementations, a priority order of message types can be considered when determining the timing and prioritization of messaging signals (130). The priority order can define a preferential order of message types for a given user, according to which messaging signals can be prioritized. In one implementation, the priority order for a given user is based on the message type of the last message that was sent to the user (132). In one implementation, the message type of the last message defines the least prioritized type in the priority order. In one implementation, the priority order is defined based on a priority cycle (134). In one implementation, the message type of the last sent message defines a location within the priority cycle that is utilized to define the priority order for the user, such that the next message type in the priority cycle following that of the last sent message becomes the first message type for the priority order, with the remaining message types in the priority order defined in sequence according to the priority cycle.

In some implementations, social closeness can be considered when determining the timing and prioritization of messaging signals (136). Social closeness is a characterization of a relationship between two users of the social network, and may be determined based on various factors, including but not limited to the following: location within a social graph, an amount of communication between the two users, designation by one or both of the two users as being socially close, membership in common groups/communities, common information, common interests, etc. In one implementation, messaging signals for content from users that are socially close are prioritized over messaging signals for content from users that are not/less socially close. In one implementation, social closeness can be defined in a binary manner, wherein a user either is or is not considered to be socially close to another user. In one implementation, a messaging signal featuring content from a user that is socially close to the selected user is prioritized over other messaging signals that do not feature such content. Furthermore, for a particular messaging signal, a corresponding message generated based on the particular messaging signal may include content that is prioritized based on social vicinity and closeness.

The foregoing examples of factors which may be utilized and considered to determine the timing and prioritization of messaging signals have been described by way of example and not limitation, to illustrate certain implementations of the present disclosure. It will be appreciated that other factors may be considered when determining timing/prioritization of messaging signals. Furthermore, any of the foregoing factors may be considered in combination for purposes of determining timing/prioritization of messaging signals. In some implementations, weighted combinations of factors are calculated to determine a score that is compared against one or more thresholds to define the timing/prioritization of messaging signals.

Figure 2:
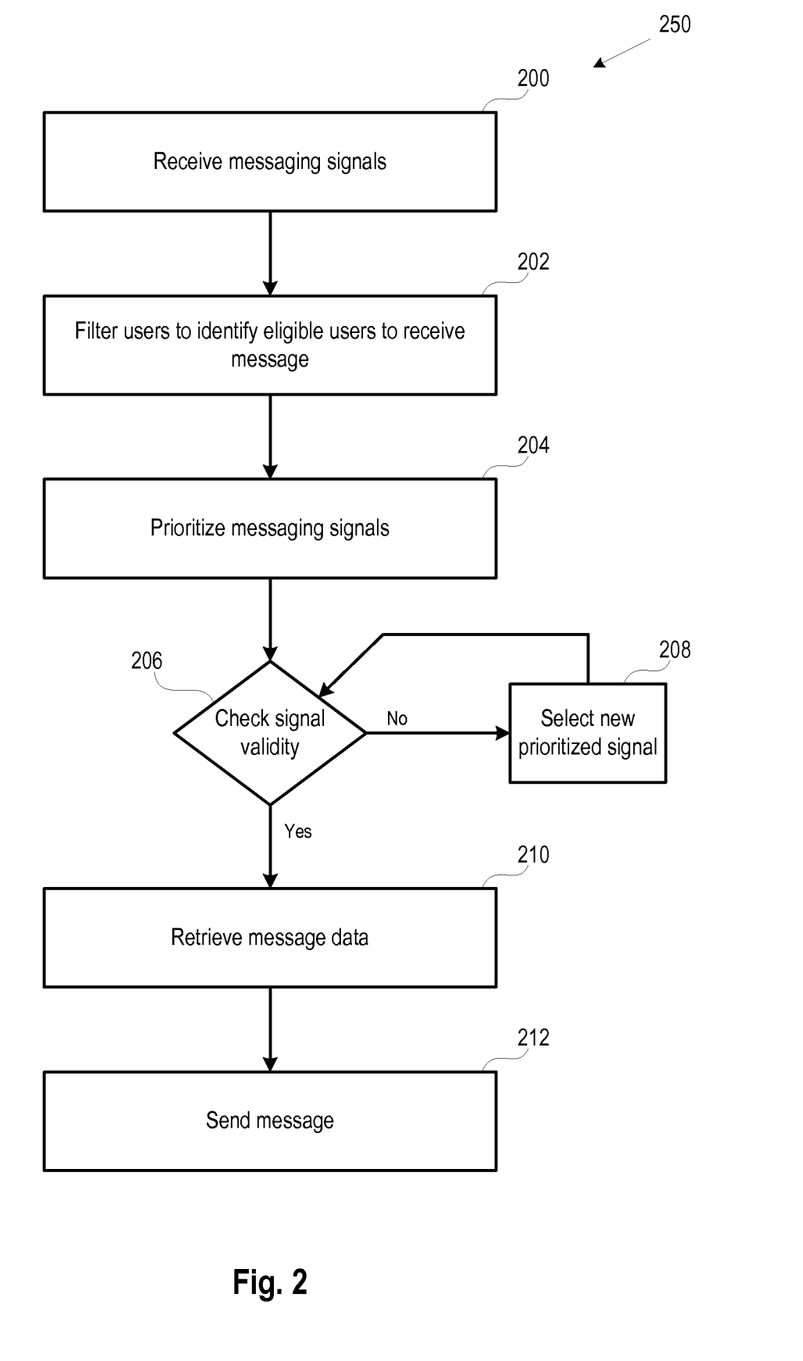
FIG. 2 illustrates a method for processing messaging signals to send a message to a user, in accordance with an implementation of the present disclosure.

FIG. 2 illustrates a method for processing messaging signals to send a message to a user, in accordance with an implementation of the present disclosure. Method 250 may be performed by processing logic that may comprise hardware (e.g., circuitry, dedicated logic, programmable logic, microcode, etc.), software (such as instructions run on a processing device), firmware, or a combination thereof. In one implementation, method 250 is performed by re-engagement notification module 345 illustrated in of FIG. 3 and FIG. 8.

Referring to FIG. 2, at method operation 200, messaging signals for a plurality of users are received. Each messaging signal indicates that a given source has identified a selected user to receive a message. Thus, each user may accumulate multiple messaging signals over time, with each messaging signal indicating that there is a message intended for that user. As described herein, a messaging signal may additionally reference or include content to be included in a message sent to its selected user.

At method operation 202, the plurality of users are filtered to identify eligible users to receive a message. In various implementations, the methods according to which the eligible users are identified may vary. In one implementation, eligible users are determined to be those users that have not received a message within a predefined preceding time period (e.g. users that have not received a message within the past N number of months/weeks/days/hours). In one implementation, eligible users are determined to be those users that have not logged in to or otherwise accessed the social network within a predefined preceding time period (e.g. users that have not accessed or logged in within the past N number of weeks/days). In another implementation, eligible users are determined to be those users that have fewer than a predefined number of members in their social graphs. In another implementation, eligible users are determined to be those users that have not posted, commented or otherwise generated content for the social network within a predefined preceding time period. In another implementation, eligible users are determined to be those users that have logged in to the social network for an amount of time that is less than a predefined threshold, possibly within a predefined preceding time period (e.g. users that have logged in for less than N number of minutes, or users that have logged in for less than N number of minutes within the past week). In another implementation, eligible users are determined to be those users that have not accessed a given feature or property relating to the social network, or that have accessed the feature or property to an extent less than a predefined threshold (e.g. users that have not joined a community, or that have joined fewer than a predefined number of communities; users that have not posted any photos/videos to the social network, or that have posted fewer than a predefined number of photos/videos; users that have not added any applications to their account, or that have not added fewer than a predefined number of applications; etc.). In still other implementations, any of the foregoing can be considered in combination to determine users that are eligible to receive a message.

At method operation 204, for a given eligible user, that user's messaging signals are prioritized. Various factors and methods for prioritizing messaging signals are described elsewhere herein, and any of such factors and methods may be applied, alone or in combination, to determine a prioritized order of the messaging signals. The prioritized order of messaging signals for the eligible user defines the order in which messaging signals will be considered for possible sending of a message to the eligible user. The factors may include at least those described above in conjunction with FIG. 1.

At method operation 206, a messaging signal for the eligible user is selected in accordance with the prioritized order of messaging signals, and the validity of the selected messaging signal is checked. As discussed previously, validation of a messaging signal may entail communication with the source that generated the messaging signal to determine whether the messaging signal is still valid. If the messaging signal is not valid, then at method operation 208, the next messaging signal according to the prioritized order is selected, and the method returns to method operation 206, wherein the validity of the newly selected messaging signal is checked for its validity.

When a selected messaging signal is determined to be valid, then the method continues to method operation 210, wherein message data is retrieved to define content of a message according to the validated selected messaging signal. In some implementations, the message data is retrieved from the source; whereas in other implementations, the message data is included in the messaging signal, and retrieved there from. At method operation 212, the message is sent to the selected user of the validated selected messaging signal. In some implementations, this may entail accessing a messaging protocol/API to instruct a messaging server to send the message to the selected user.

In some implementations, the prioritization and validation procedures prevent the user from receiving all messages that are intended for him/her as defined by the user's messaging signals. In this example, the user receives a limited number of messages as compared to the total number messages which might otherwise be received in the absence of such procedures. This can improve the user experience by not over-communicating with the user.

Figure 3:
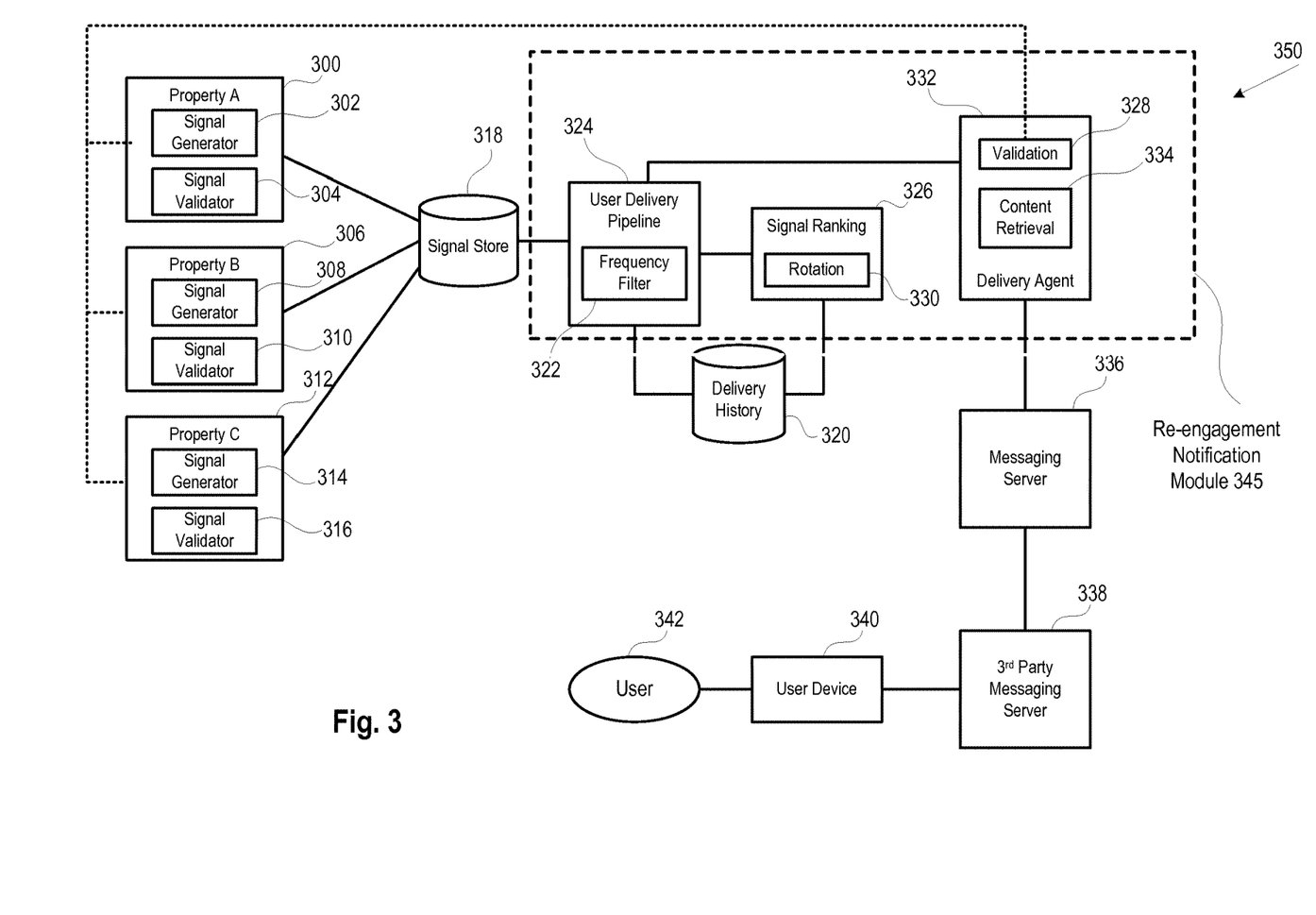
FIG. 3 illustrates a system for prioritizing messaging signals and sending messages to users, in accordance with an implementation of the present disclosure.

FIG. 3 illustrates a system for prioritizing messaging signals and sending messages to users, in accordance with an implementation of the present disclosure. In system 350, an entity system 300 defines a system for a given property, product, or feature group that may identify users to receive messages. The entity system 300 may be defined by one or more servers. The entity system 300 includes a messaging signal generator 302 that is configured to generate messaging signals for selected users. The entity system 300 further includes a messaging signal validator 304 for validating previously generated messaging signals, as described in further detail below.

Entity systems 306 and 312 are additionally shown, and each is similar to entity system 300 but representative of a different entity (different property, product, or feature). Entity system 306 includes a messaging signal generator 308 and a messaging signal validator 310. Entity system 312 includes a messaging signal generator 314 and a messaging signal validator 316.

When a messaging signal is generated by any of the messaging signal generators 302, 308, or 314, for a given selected user, the messaging signal is stored to a signal store 318. The signal store 318 thus receives and accumulates messaging signals for each of a plurality of users.

A delivery history 320 stores records of messages that have previously been delivered to users. Each specific user will have a history of messages that have been sent to him/her. A record of a given message can include data identifying the entity system that requested the message to be sent (and defines the message type), the selected user, the date/time that the message was sent, and content that was included in the message.

A user delivery pipeline 324 is configured to identify users that are eligible to receive a message. The user delivery pipeline may include a frequency filter 322 that is configured to identify eligible users based on a temporal metric determined from each user's prior messages (which are recorded in the delivery history 320). In one implementation, users are eligible to receive a message if they have not received a message within a prior predefined time period, e.g. have not received a message within the past N number of days. In one implementation, the user delivery pipeline 324 identifies the users that are eligible to receive a message, and also defines an order according to which the eligible users will be processed for sending of messages. As discussed further below, the messaging signals for the eligible users are ranked by a signal ranking module, whereas the messaging signals for the ineligible users are not ranked, so that resources are not unnecessarily applied to rank messaging signals for ineligible users.

A delivery agent 332 is configured to manage the sending of messages to users. In some implementations, not all messages which are intended for a given user will necessarily be received by the user. The delivery agent 332 selects a next user from the user delivery pipeline 324 for processing to receive a message. For the selected user, a signal ranking unit 326 is invoked to rank the messaging signals that have been accumulated for the selected user (as stored in the signal store 318). The signal ranking unit 326 may apply any of the factors and methods described elsewhere herein to determine a ranked priority order for the messaging signals of the selected user. In one implementation, a standard rotation 330 is applied to determine the priority order, wherein based on a message type of the last message sent to the selected user, the standard rotation is utilized to determine the priority order of the messaging signals of the selected user. This procedure is described in greater detail elsewhere herein.

After the priority order of the messaging signals is determined, the delivery agent 332 sequentially selects the messaging signals according to the priority order and performs a validation procedure on each selected messaging signal until a valid messaging signal is identified. If the first selected messaging signal from the priority order is valid, then no other messaging signals need to be validated, and only the highest priority messaging signal according to the priority order is considered. The delivery agent 332 can include a validation module 328 that is configured to perform the validation procedure for a selected messaging signal.

In some implementations, the validation procedure is an optional procedure. Some messaging signals may be configured to require a validation procedure to be performed, while other messaging signals may be configured to not require a validation procedure to be performed. In such implementations, then the first selected messaging signal (according to the priority order) that either (a) does not require validation, or (b) requires validation and is determined to be valid, is utilized by the delivery agent 332 to define a message for the selected user.

The delivery agent 332 is configured to generate a message to be sent to the selected user based on the selected messaging signal in accordance with the above. In some implementations, the messaging signal may not include content to define the message, and therefore a content retrieval module 334 is activated to retrieve content to be included in the message. In one implementation the messaging signal includes a reference to the content that is to be retrieved and included in the message. In another implementation, the content retrieval module 334 is configured to retrieve content from the entity system that generated the messaging signal. It should be appreciated that the content may itself be defined by references that are to be embedded within the message, and which will be rendered when the message is delivered for viewing by the selected user who is the intended recipient of the message.

Re-engagement notification module 345 may include some or all of the elements depicted in system 300. Additionally, it may perform some or all of the actions or methods described herein. In FIG. 3, re-engagement notification module 345 includes user delivery pipeline 324, single ranking unit 326, and delivery agent 332.

After assembling the content for the message, the delivery agent 332 may effect sending of the message to the selected user by accessing a messaging server 336 that is configured to handle delivery of messages. The messaging server may define a protocol or API that is accessed by the delivery agent 332 and utilized to cause the messaging server 336 to generate and send the message, including its predefined content, to the selected user. In some implementations, the messaging server 336 may interact with a third-party messaging server 338, to effect delivery of the message to another platform's messaging service (e.g. third-party e-mail platform). The selected user (342) may access and view the message on a user device 340. The user device 340 can be, for example, a personal computer (PC), a laptop, a mobile phone, a smart phone, a tablet computer, a netbook computer, etc. The user device 340 can include an application that allows a user to access the social network and view content, such as images, videos, web pages, documents, etc. This application may be, for example, a web browser that can access, retrieve, present, and/or navigate content (e.g., web pages such as Hyper Text Markup Language (HTML) pages, digital media items, etc.) served by a web server of the social network. In another example, the application may be a standalone application (mobile app or app provided by the social network) that allows the user to access the social network and view content (e.g., digital videos, digital images, electronic books, etc.).

In some implementations, the messaging servers (e.g., messaging server 336) can be e-mail servers. Whereas in other implementations, the messaging servers can be defined to handle other forms of electronic messaging, including instant messaging, private messaging, notifications, alerts, and text messaging. Furthermore, in some implementations, a specific form of messaging can be selected by the delivery agent 332 based on various factors such as predefined user preferences, a user profile, the type of message to be delivered, a priority rating assigned to the message, etc.

In situations in which the systems discussed here collect personal information about users, or may make use of personal information, the users may be provided with an opportunity to control whether system 350 collects user information (e.g., information about a user's social network, social actions or activities, profession, a user's preferences, or a user's current location), or to control whether and/or how to receive messages discussed herein. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by system 350.

Figure 4:
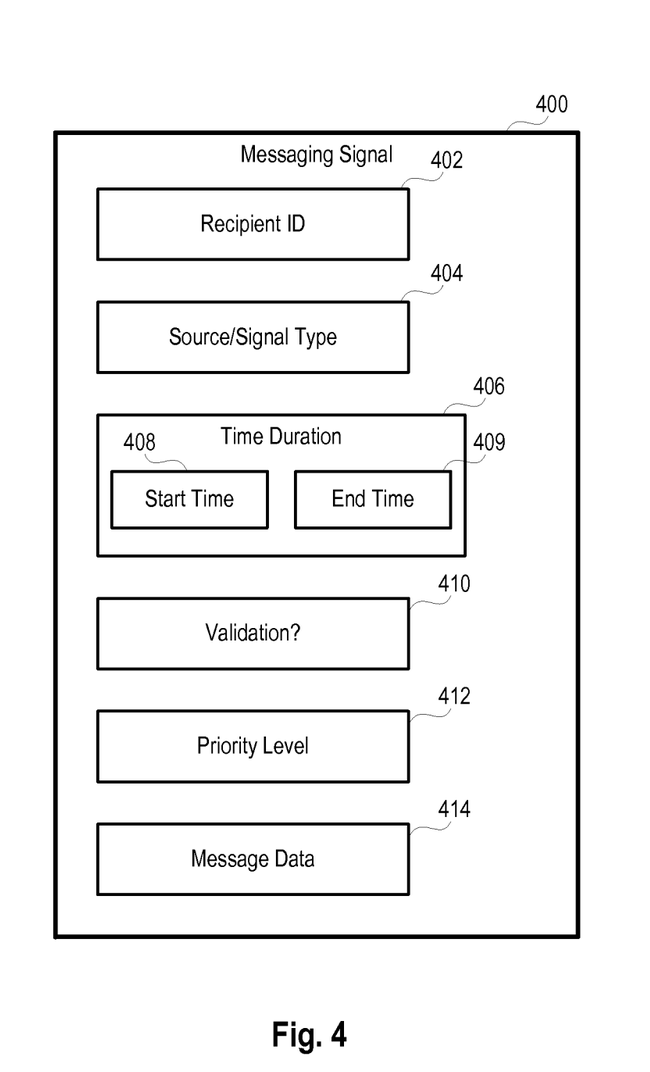
FIG. 4 illustrates examples of data that may be included to define a messaging signal, in accordance with an implementation of the present disclosure.

FIG. 4 illustrates examples of data that may be included to define a messaging signal, in accordance with an implementation of the present disclosure. The messaging signal 400 is defined to indicate that a selected recipient user has been identified to receive a message, and may include various types of data. The messaging signal 400 can include a recipient identifier (ID) 402 that identifies the selected user of the messaging signal, for whom the messaging signal will be stored in association. A source or signal type 404 identifies a type for the messaging signal, to facilitate classification of the messaging signal, and may also identify the entity system that generated the messaging signal. It will be appreciated that the type can be defined by any of the above-described entities, such as properties, products or features related to the social network.

The messaging signal 400 may further include a time duration 406 that identifies a period of time for which the messaging signal may be utilized to send a message to its selected user. A start time 408 and an end time 409 may be defined.

The messaging signal 400 can include a validation indicator 410, which defines whether or not a validation procedure is required to be performed before a message may be sent based on the messaging signal.

The messaging signal 400 can include a priority level 412, which may define a level of priority assigned to the messaging signal by the entity system that generates the messaging signal.

The messaging signal 400 can include message data 414, which defines content to be included in a message that is sent based on the messaging signal. The message data 414 can include text, pictures, audio, video, or any other type of content which may be included in a message. Furthermore, the message data 414 may define references to content. The message data 414 can include or reference specific items or activity on a social network, such as posts (which may contain various types of content), comments, additions to a social graph, profile updates, birthdays, milestones, endorsements, offers or acceptance of offers, new users, application activities including achievements, etc.

Figure 5:
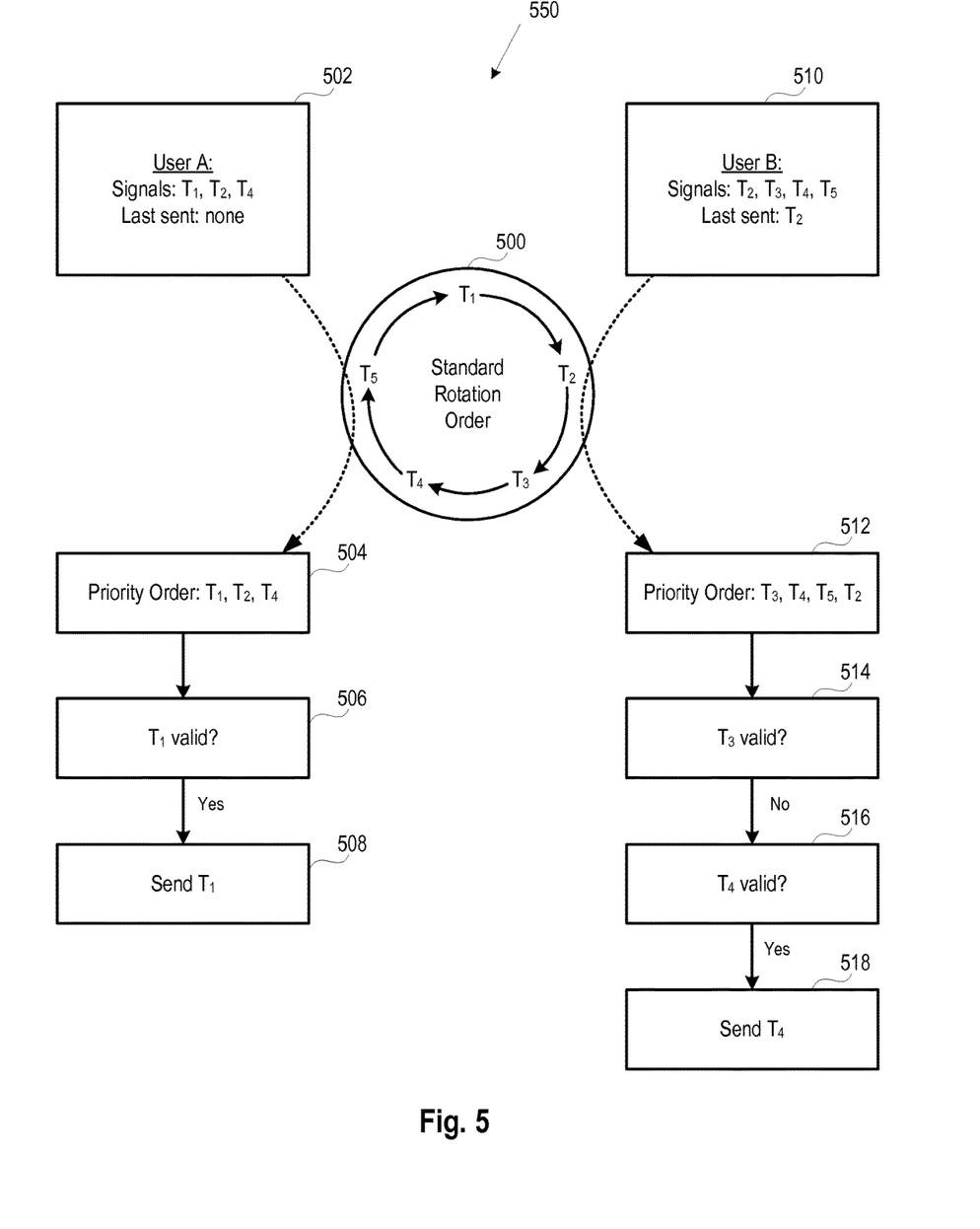
FIG. 5 conceptually illustrates examples of a method for prioritizing messaging signals, in accordance with an implementation of the present disclosure.

FIG. 5 conceptually illustrates examples of a method for prioritizing messaging signals, in accordance with an implementation of the present disclosure. Method 550 may be performed by processing logic that may comprise hardware (e.g., circuitry, dedicated logic, programmable logic, microcode, etc.), software (such as instructions run on a processing device), firmware, or a combination thereof. In one implementation, method 550 is performed by re-engagement notification module 345 illustrated in of FIG. 3 and FIG. 8.

Referring to FIG. 5, a standard rotation order of various message types is shown at 500. As shown, there are five types, designated $T_1$, $T_2$, $T_3$, $T_4$, and $T_5$, which are rotated in the order listed ($T_1$ to $T_5$, and returning to $T_1$ to repeat the cycle). This means that when a given user is eligible to receive messages, then the messages will be prioritized according to the order shown. Additionally, the type of the last message sent to a given user is utilized to determine the start point within the standard rotation order 500 that is applied to determine the prioritization of the user's messaging signals. The following examples serve to illustrate the principles of the presently described method for prioritization of messaging signals based on the standard rotation order.

At reference 502, data for a user A is acquired. Messaging signals of the following types have been accumulated for the user A: $T_1$, $T_2$, and $T_4$. The user A has not been sent any messages, and therefore there is no specific type defined for a last sent message to the user A. Therefore, the start point within the standard rotation order is arbitrarily chosen as $T_1$. That is, the messaging signals will be prioritized by type according to the standard rotation order beginning with type $T_1$ and continuing according to the standard rotation order. The priority order for the user A's messaging signals is thus as follows: $T_1$, $T_2$, $T_4$ (504). The messaging signals are then considered according to the priority order. At reference 506, the messaging signal have type T1 is first considered to determine if it is valid, and assuming that the messaging signal is valid, then the message designated by that messaging signal is generated and sent to the selected user (508). If the messaging signal was not valid, then the next messaging signal having type $T_2$ would have been selected next for consideration, followed by the messaging signal having type $T_4$ if necessary.

As shown at reference 510, data for a user B is acquired to facilitate sending a message to the user B. Messaging signals having the following types have been accumulated for the user B: $T_2$, $T_3$, $T_4$, $T_5$. Additionally, the last sent message to the user B was of type $T_2$. Because the last sent message was of type $T_2$, then the application of the standard rotation order is defined beginning with the next type in the cycle, $T_3$, and continuing according to the predefined cyclical order. Therefore, the priority order of messaging signals for user B is determined as follows: $T_3$, $T_4$, $T_5$, $T_2$. At reference 514, the first messaging signal from the priority order is selected for validation. That is, the messaging signal having type $T_3$ is selected first for validation. If the messaging signal is not valid, then the next messaging signal according to the priority order is selected for validation, which is the messaging signal having type $T_4$. Assuming that this messaging signal is valid, then at reference 518, a message is generated and sent in accordance with the type $T_4$ messaging signal.

Figure 6:
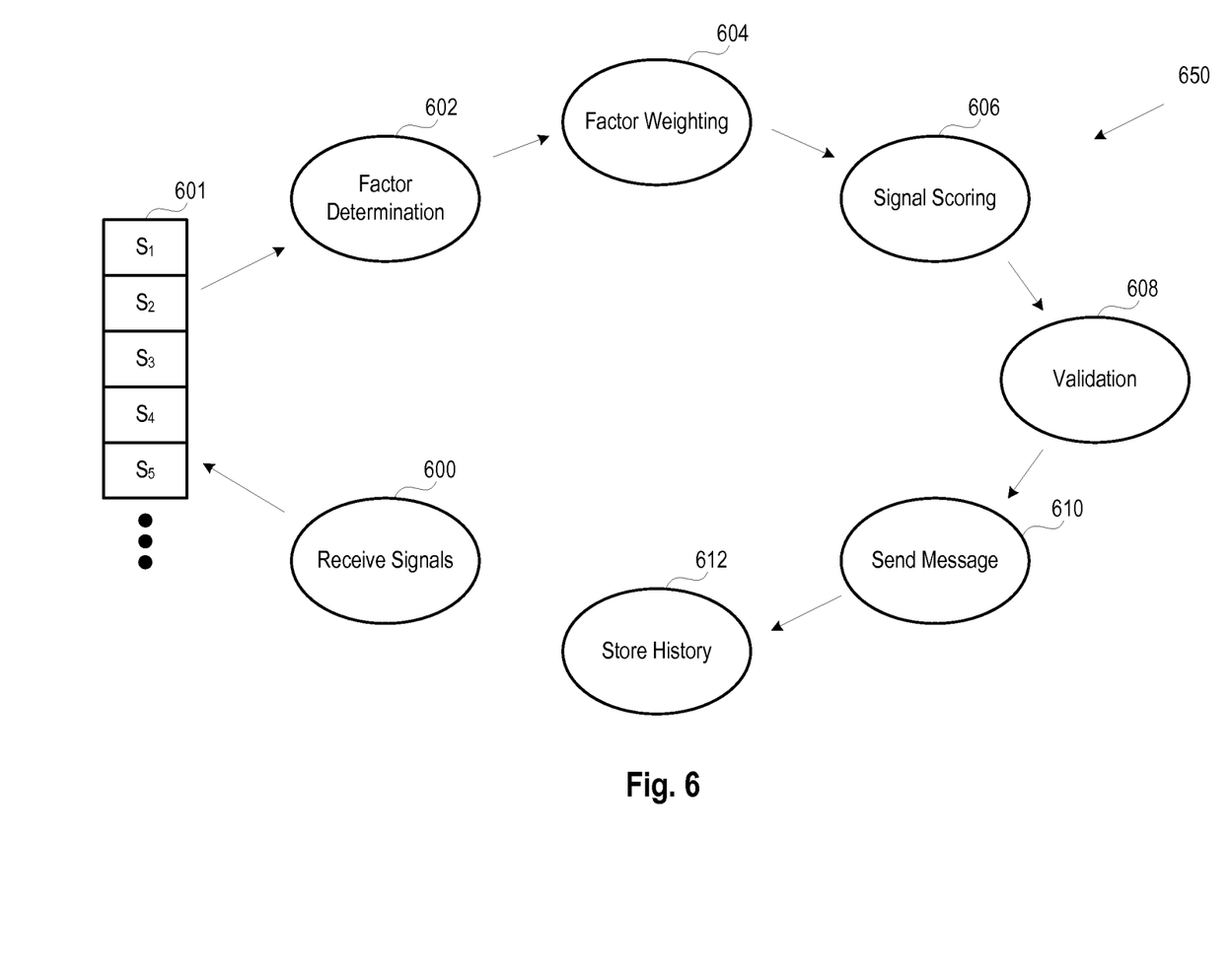
FIG. 6 illustrates a method for prioritizing messaging signals for sending messages to users of a social network, in accordance with implementations of the present disclosure.

FIG. 6 illustrates a method for prioritizing messaging signals for sending messages to users of a social network, in accordance with implementations of the present disclosure. Method 650 may be performed by processing logic that may comprise hardware (e.g., circuitry, dedicated logic, programmable logic, microcode, etc.), software (such as instructions run on a processing device), firmware, or a combination thereof. In one implementation, method 650 is performed by re-engagement notification module 345 illustrated in of FIG. 3 and FIG. 8.

Referring to FIG. 6, messaging signals are received and accumulated for a plurality of users. Messaging signals for a given user are conceptually shown at reference 601. At method operation 602, various factors are determined for prioritization of the messaging signals of a given user. Each of the messaging signals for the given user may have a set of factors to be applied for prioritization of the messaging signal. These factors may include any of the aforementioned factors described above for purposes of messaging signal prioritization. Each of the factors may be quantified so as to be represented by a numerical value. At method operation 604, weights are determined for each of the factors. The specific configuration of weights can be personalized for the user based on known characteristics of the user, which may include personal information, preferences, activity history, etc. For example, different weights can be defined for different user preferences and/or different user activity histories, and weights for the user can be determined based on that user's preferences and/or activity history.

At method operation 606, for each messaging signal, the weights are applied to the factors to determine an overall score. The messaging signals are then prioritized according to their overall scores. At method operation 608, the prioritized messaging signals are validated in the order of their prioritization until a valid messaging signal is identified. At method operation 610, a message is sent to the user as designated by the valid messaging signal. At method operation 612, a record of the sent message is stored to a delivery history.

In the present disclosure, several implementations have been described in the context of social networks and related properties, products, and features. However, it should be appreciated that the principles of operation defined by these implementations may be applied in the context of other types of properties and systems for which users may be identified across such properties and systems. For example, a web portal may be defined to include several distinct content properties that can be accessed by a given user using the same login identifier. An operator of the web portal may utilize the methods and systems described herein to manage the sending of messages to users, for purposes of encouraging re-engagement or otherwise. As another example, an operator of a collection of websites or website features may wish to manage the sending of messages to users, and assuming that a given user can be identified across the collection of websites (e.g. based on common identifying information), then methods and systems as described herein can be applied to accomplish this purpose.

It should be appreciated that in accordance with the presently described implementations, messages are not automatically sent to a user whenever a source entity system identifies a given user to receive a message. A source entity system may generate the aforementioned messaging signals; however, a message may or may not result from the generation of a messaging signal depending upon user eligibility and prioritization of messages as described above. Accordingly, the user does not automatically receive messages when a source entity system identifies the user to receive a message. Instead, messaging is gated/filtered via the presently described mechanisms, and the user receives specific messages through these processes, rather than any message which a source entity system may designate for the user. Thus, the user may not receive all messages which are identified for him/her.

The presently described systems and methods provide technical advantages over existing systems and methods for managing electronic messaging. Centralization of logic for prioritization of electronic messaging can limit the number of electronic messages that are sent to users. This reduces the resource utilization that would otherwise be incurred to send messages to users. Systems responsible for sending messages can receive fewer queries per unit time and incur less load, thus saving energy and extending resource lifetime. Additionally, duplication of effort amongst product teams is avoided because different teams do not need to recreate the same kinds of messaging related procedures described above (e.g. prioritization, timing, recipient eligibility).

Figure 7:
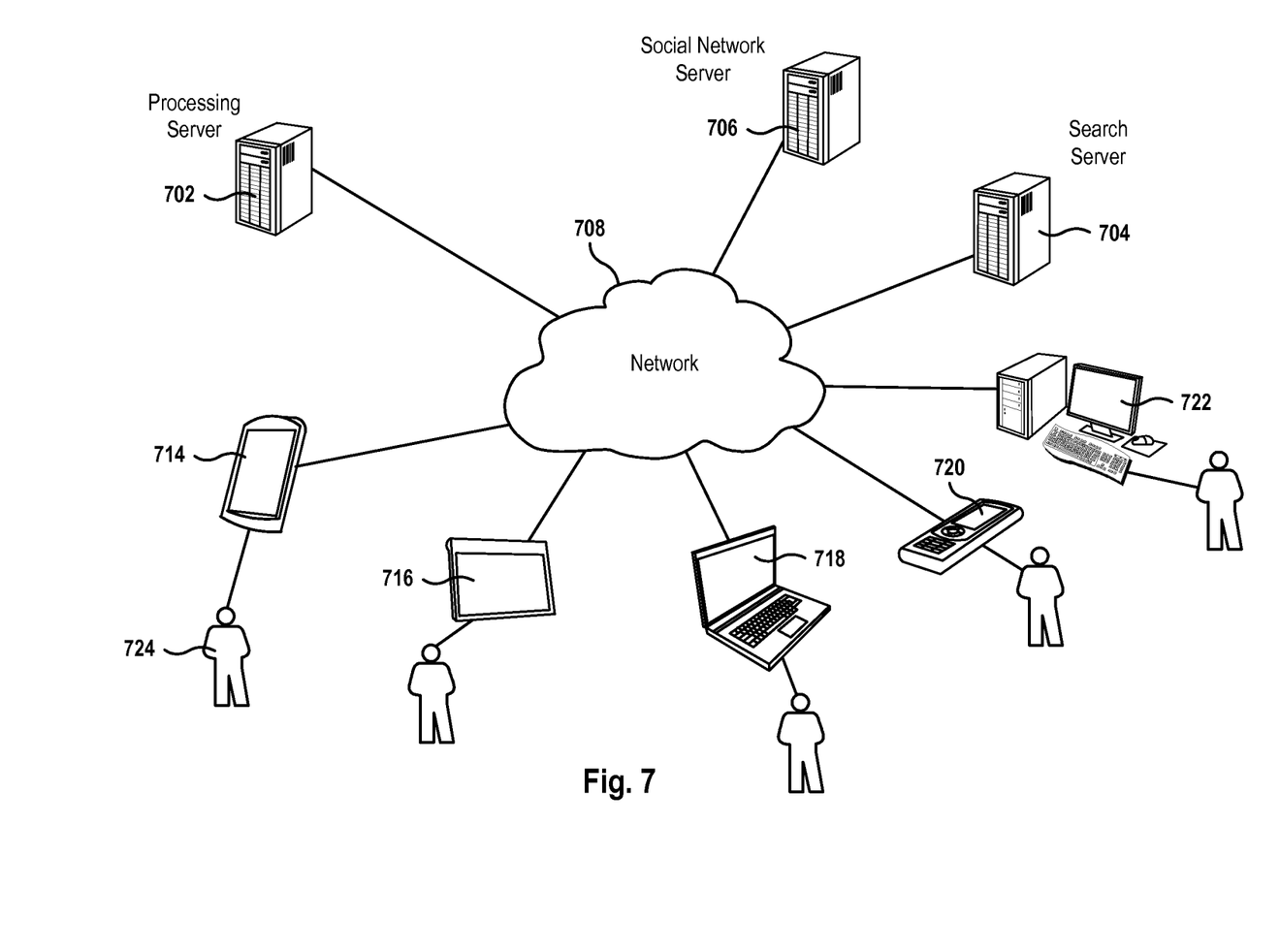
FIG. 7 illustrates an example architecture of a system for implementing implementations of the disclosure, in accordance with implementations of the present disclosure.

FIG. 7 provides one example of an architecture of a system that may utilize implementations described herein. Users 724 interact with each other in the context of a social network, where users can include real people and entities. Each user has an account in the social network, and the account includes at least a user name. In addition, each account can include a profile of the user with additional information about the user, e.g., birth date, residence, favorite activities, etc. The user can be in control of what information is added to the profile, and what information is shared with others. A user may access the social network through different devices, e.g., a smart phone 714, a tablet computer 716, a laptop 718, a mobile phone 720, a personal computer 722, or any computing device that provides access to the Internet. Of course, the illustrated devices are only examples.

In accordance with some implementations, social network server 706 delivers services that enable users to interface with each other. The social network provides a site that enables users to define user accounts, which can be accounts for people and entity accounts. Through those accounts, users are able to connect with their friends, group of friends, entities, groups of entities, etc. In some implementations, the relationships established in the social network may be utilized in other contexts. Processing server 702 can be configured to perform various additional functions related to the social network, e.g., executing applications which run within the social networking environment, or processing data relating to external sites which have integrated social functionality. Search server 704 provides Internet search capabilities.

It is noted that the implementations illustrated in FIG. 7 are illustrative of certain implementations. Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 7 should therefore not be interpreted to be exclusive or limiting, but rather illustrative.

Figure 8:
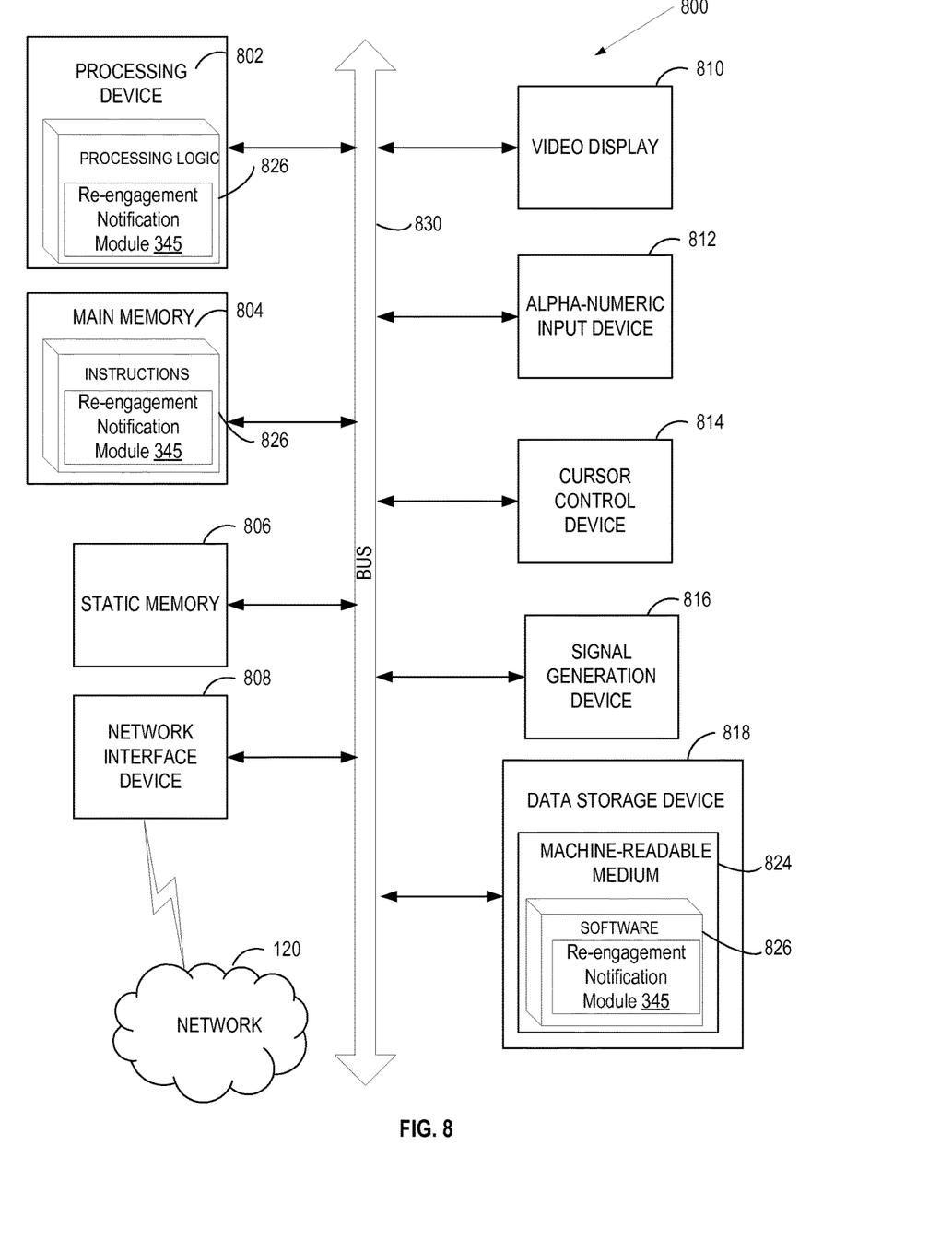
FIG. 8 is a schematic diagram of a computer system for implementing implementations of the present disclosure.

FIG. 8 illustrates a diagrammatic representation of a machine in the example form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808 communicably coupled to a network 120. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 824 on which is stored software 826 embodying any one or more of the methodologies of functions described herein. The software 826 may also reside, completely or at least partially, within the main memory 804 as instructions 826 and/or within the processing device 802 as processing logic 826 during execution thereof by the computer system 800; the main memory 804 and the processing device 802 also constituting machine-accessible storage media.

The machine-readable storage medium 824 may also be used to store instructions 826 to implement the re-engagement notification module 345 to implement any one or more of the methodologies of functions described herein in a computer system, such as the system described with respect to FIG. 4 and FIG. 7, and/or a software library containing methods that call the above applications.

While the machine-accessible storage medium 824 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "examining", "generating", "determining", "sending", "identifying", "filtering", "validating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   receiving, by a processing device, a plurality of messaging signals that identify a user of a content sharing network and messages to be sent to the user, wherein each of the plurality of messaging signals are provided by one of a plurality of systems of the content sharing network;
   determining whether the user is eligible to receive the messages associated with the plurality of messaging signals by determining whether previous messages were sent to the user within a threshold amount of time; and
   responsive to determining the user is eligible to receive the messages,
      determining a prioritization order for the plurality of messaging signals that identify the user and the messages to be sent to the user based on characteristics of the plurality of systems that provided the plurality of messaging signals and a system of the plurality of systems that provided a previous message that was sent to the user, wherein the prioritization order indicates an order in which the plurality of messaging signals that identify the user and the messages to be sent to the user are examined to further identify a valid messaging signal from the plurality of messaging signals for sending to the user,
      examining the plurality of messaging signals in the order indicated by the prioritization order to identify the valid messaging signal from the plurality of messaging signals, wherein the valid messaging signal is identified as being relevant to the user, and
      sending to the user a respective one of the messages associated with the valid messaging signal.

2. The method of claim 1, wherein sending to the user the respective one of the messages comprises retrieving message content to define the respective one of the messages that is based on the valid messaging signal.

3. The method of claim 1, wherein examining the plurality of messaging signals in the order indicated by the prioritization order comprises determining whether a given messaging signal of the plurality of messaging signals is currently valid.

4. The method of claim 3, wherein the given messaging signal identifies a message requesting the user to perform an action, and wherein determining whether the given messaging signal is currently valid comprises determining whether the user has performed the action.

5. The method of claim 1, wherein examining the plurality of messaging signals in the order indicated by the prioritization order comprises determining whether content identified by a given messaging signal of the plurality of messaging signals currently exists.

6. The method of claim 1, wherein at least one of the plurality of messaging signals comprises messaging content defining a message to be sent to the user.

7. The method of claim 1, wherein the respective one of the messages sent to the user is defined by an electronic communication selected from at least one of an e-mail, a notification, an alert, a private message, an instant message, or a text message.

8. The method of claim 7, wherein the electronic communication is selected based on a predefined user preference.

9. The method of claim 1, wherein examining the plurality of messaging signals in the order indicated by the prioritization order comprises validating the plurality of messaging signals in the order indicated by the prioritization order until the valid messaging signal is identified.

10. A non-transitory machine-readable medium comprising instructions that, responsive to being executed by a processing device, cause the processing device to perform operations comprising:

receiving, by the processing device, a plurality of messaging signals that identify a user of a content sharing network and messages to be sent to the user, wherein each of the plurality of messaging signals are provided by one of a plurality of systems of the content sharing network;

determining whether the user is eligible to receive the messages associated with the plurality of messaging signals by determining whether previous messages were sent to the user within a threshold amount of time; and responsive to determining the user is eligible to receive the messages, determining a prioritization order for the plurality of messaging signals that identify the user and the messages to be sent to the user based on characteristics of the plurality of systems that provided the plurality of messaging signals and a system of the plurality of systems that provided a previous message that was sent to the user, wherein the prioritization order indicates an order in which the plurality of messaging signals that identify the user and the messages to be sent to the user are examined to further identify a valid messaging signal from the plurality of messaging signals for sending to the user, examining the plurality of messaging signals in the order indicated by the prioritization order to identify the a valid messaging signal from the plurality of messaging signals, wherein the valid messaging signal is identified as being relevant to the user, and sending to the user a respective on of the messages associated with the valid messaging signal.

11. The non-transitory machine-readable medium of claim 10, wherein sending to the user the respective one of the messages comprises retrieving message content to define the respective one of the messages that is based on the valid messaging signal.

12. The non-transitory machine-readable medium of claim 10, wherein examining the plurality of messaging signals in with the order indicated by the prioritization order comprises determining whether a given messaging signal of the plurality of message signals is currently valid.

13. The non-transitory machine-readable medium of claim 12, wherein the given messaging signal identifies a message requesting the user to perform an action, and wherein determining whether the given messaging signal is currently valid comprises determining whether the user has performed the action.

14. The non-transitory machine-readable medium of claim 10, wherein examining the plurality of messaging signals in the order indicated by the prioritization order comprises determining whether content identified by a given messaging signal of the plurality of messaging signals currently exists.

15. The non-transitory machine-readable medium of claim 10, wherein at least one of the plurality of messaging signals comprises messaging content defining a message to be sent to the user.

16. The non-transitory machine-readable medium of claim 10, wherein the respective one of the messages sent to the user is defined by an electronic communication selected from at least one of an e-mail, a notification, an alert, a private message, an instant message, or a text message.

17. The non-transitory machine-readable medium of claim 16, wherein the electronic communication is selected based on a predefined user preference.

18. A system comprising:

a memory; and a processing device, coupled to the memory, the processing device to:

receive a plurality of messaging signals associated with a user that identify a user of a content sharing network and messages to be sent to the user, wherein each of the plurality of messaging signals are provided by one of a plurality of systems of the content sharing network;

determine whether the user is eligible to receive the messages associated with the plurality of messaging signals by determining whether previous messages were sent to the user within a threshold amount of time; and responsive to determining the user is eligible to receive the messages, determine a prioritization order for the plurality of messaging signals that identify the user and the messages to be sent to the user based on characteristics of the plurality of systems that provided the plurality of messaging signals and a system of the plurality of systems that provided a message that was sent to the user, wherein the prioritization order indicates an order in which the plurality of messaging signals that identify the user and the messages to be sent to the user are examined to further identify a valid messaging signal from the plurality of messaging signals for sending to the user, examine the plurality of messaging signals in the order indicated by the prioritization order to identify the valid messaging signal from the plurality of messaging signals, wherein the valid messaging signal is identified as being relevant to the user, and send to the user a respective one of the messages associated with the valid messaging signal.

19. The system of claim 18, wherein to send to the user the respective one of the messages, the processing device to retrieve message content to define the respective one of the messages that is based on the valid messaging signal.

20. The system of claim 18, wherein to examine the plurality of messaging signals in the order indicated by the prioritization order, the processing device to determine whether a given messaging signal of the plurality of messaging signals is currently valid.

* * * * *